US010485281B2

(12) United States Patent
Stanhope et al.

(10) Patent No.: US 10,485,281 B2
(45) Date of Patent: Nov. 26, 2019

(54) FLAME RESISTANT THERMAL LINERS AND GARMENTS MADE WITH SAME

(71) Applicant: Southern Mills, Inc., Union City, GA (US)

(72) Inventors: Michael T. Stanhope, Atlanta, GA (US); Matthew Lucius Colatruglio, Roswell, GA (US)

(73) Assignee: Southern Mills, Inc., Union City, GA (US)

( * ) Notice: Subject to any disclaimer, the term of this patent is extended or adjusted under 35 U.S.C. 154(b) by 159 days.

(21) Appl. No.: 15/404,701

(22) Filed: Jan. 12, 2017

(65) Prior Publication Data

US 2017/0203540 A1  Jul. 20, 2017

Related U.S. Application Data

(60) Provisional application No. 62/278,865, filed on Jan. 14, 2016.

(51) Int. Cl.
*A41D 27/02* (2006.01)
*A41D 31/08* (2019.01)
(Continued)

(52) U.S. Cl.
CPC ........... *A41D 31/085* (2019.02); *A41D 27/02* (2013.01); *A41D 31/02* (2013.01); *A41D 31/102* (2019.02);
(Continued)

(58) Field of Classification Search
None
See application file for complete search history.

(56) References Cited

U.S. PATENT DOCUMENTS 3,687,774 A * 8/1972 Grubstad ................ B29C 66/00
156/324
3,925,823 A * 12/1975 Kupferman .......... A62B 17/003
2/81
(Continued)

FOREIGN PATENT DOCUMENTS

BE    1020481 A3 * 11/2013 ........... A41D 31/085
CN    1586884 A  *  3/2005
(Continued)

OTHER PUBLICATIONS

International Association of Fire Fighters, Next Generation Structural Fire Fighting PPE with Chemical/Biological Protection, Dec. 2009 (Year: 2009).*

(Continued)

*Primary Examiner* — Jeffrey A Vonch
(74) *Attorney, Agent, or Firm* — Kilpatrick Townsend & Stockton LLP

(57) ABSTRACT

Embodiments of the present invention replace relatively bulky nonwoven thermal insulating materials used in thermal liners with thin, lightweight, flexible films that maintain or improve TPP performance while reducing the thickness, and enhancing the flexibility, of the thermal liner so as to increase wearer comfort. Moreover, the films incorporated into the thermal liners can be both air and vapor permeable such that the TPP performance is not realized at the expense of THL performance. Rather, the THL performance of garments incorporating embodiments of thermal liners contemplated herein is comparable to—if not improved over— garments formed with traditional thermal liners.

15 Claims, 10 Drawing Sheets

(51) Int. Cl.
    *A41D 31/102*           (2019.01)
    *A41D 31/02*            (2019.01)
    *B32B 3/24*              (2006.01)
    *B32B 5/02*              (2006.01)
    *B32B 7/09*              (2019.01)
    *B32B 27/12*            (2006.01)
    *B32B 27/32*            (2006.01)
    *B32B 5/26*              (2006.01)
    *B32B 5/06*              (2006.01)
    *A62B 17/00*            (2006.01)
    *B32B 3/26*              (2006.01)
    *B32B 5/08*              (2006.01)

(52) U.S. Cl.
    CPC ............ *A62B 17/003* (2013.01); *B32B 3/266* (2013.01); *B32B 5/022* (2013.01); *B32B 5/06* (2013.01); *B32B 7/09* (2019.01); *B32B 27/12* (2013.01); *B32B 27/322* (2013.01); *A41D 2400/00* (2013.01); *A41D 2500/10* (2013.01); *A41D 2500/20* (2013.01); *A41D 2500/30* (2013.01); *A41D 2500/52* (2013.01); *B32B 5/024* (2013.01); *B32B 5/026* (2013.01); *B32B 5/08* (2013.01); *B32B 5/26* (2013.01); *B32B 2250/05* (2013.01); *B32B 2250/42* (2013.01); *B32B 2262/0269* (2013.01); *B32B 2266/025* (2013.01); *B32B 2305/026* (2013.01); *B32B 2307/30* (2013.01); *B32B 2307/3065* (2013.01); *B32B 2307/50* (2013.01); *B32B 2307/546* (2013.01); *B32B 2307/718* (2013.01); *B32B 2307/724* (2013.01); *B32B 2307/726* (2013.01); *B32B 2307/7242* (2013.01); *B32B 2307/7246* (2013.01); *B32B 2307/732* (2013.01); *B32B 2437/00* (2013.01); *B32B 2571/00* (2013.01); *Y10S 428/921* (2013.01); *Y10T 428/24025* (2015.01); *Y10T 428/24331* (2015.01); *Y10T 442/3715* (2015.04); *Y10T 442/3854* (2015.04); *Y10T 442/3878* (2015.04); *Y10T 442/3984* (2015.04); *Y10T 442/494* (2015.04); *Y10T 442/659* (2015.04); *Y10T 442/66* (2015.04); *Y10T 442/674* (2015.04); *Y10T 442/677* (2015.04); *Y10T 442/681* (2015.04); *Y10T 442/696* (2015.04)

(56) References Cited

U.S. PATENT DOCUMENTS

| | | | | |
|---|---|---|---|---|
| 4,194,041 A * | 3/1980 | Gore | ............... | B32B 27/08 442/289 |
| 4,302,496 A * | 11/1981 | Donovan | ............... | B32B 27/12 428/196 |
| 4,500,592 A * | 2/1985 | Lee | ............... | B32B 27/12 442/230 |
| 4,514,455 A * | 4/1985 | Hwang | ............... | A41D 27/06 428/102 |
| 4,816,328 A * | 3/1989 | Saville | ............... | A61F 13/041 442/289 |
| 4,994,317 A * | 2/1991 | Dugan | ............... | A62B 17/003 442/72 |
| 5,001,781 A * | 3/1991 | Grilliot | ............... | A62B 17/003 2/69 |
| 5,014,357 A * | 5/1991 | Wiseman, Sr. | ...... | A62B 17/003 2/458 |
| 5,021,280 A * | 6/1991 | Farnworth | ............... | A41D 31/02 428/102 |
| 5,043,209 A * | 8/1991 | Boisse | ............... | A41D 27/02 442/397 |
| 5,050,241 A * | 9/1991 | Flowers | ............... | B32B 27/12 2/457 |
| 5,098,770 A * | 3/1992 | Paire | ............... | D06M 17/04 428/198 |
| 5,136,723 A * | 8/1992 | Aldridge | ............... | A41D 13/00 2/81 |
| 5,150,476 A * | 9/1992 | Statham | ............... | A41D 31/085 2/93 |
| 5,236,769 A * | 8/1993 | Paire | ............... | B32B 5/06 428/196 |
| 5,358,780 A * | 10/1994 | Kafchinski | ............... | A41D 31/02 442/289 |
| 5,418,054 A | 5/1995 | Sun | | |
| 5,534,338 A * | 7/1996 | Saito | ............... | B32B 25/08 442/230 |
| 5,539,928 A * | 7/1996 | Aldridge | ............... | A41D 31/085 2/93 |
| 5,640,718 A * | 6/1997 | Aldridge | ............... | A41D 31/085 2/81 |
| 5,685,015 A * | 11/1997 | Aldridge | ............... | A62B 17/003 2/81 |
| 5,740,551 A * | 4/1998 | Walker | ............... | A41D 19/0006 2/16 |
| 5,811,359 A * | 9/1998 | Romanowski | .......... | B32B 27/12 442/261 |
| 5,819,316 A | 10/1998 | Aldridge | | |
| 5,887,453 A * | 3/1999 | Woods | ............... | A41D 13/0158 66/171 |
| 5,928,971 A * | 7/1999 | Ellis | ............... | A62B 17/003 442/76 |
| 5,983,409 A * | 11/1999 | Aldridge | ............... | A41D 13/00 2/458 |
| 6,009,560 A * | 1/2000 | McKenney | ............... | A41D 13/01 2/244 |
| 6,317,889 B1 * | 11/2001 | Reilly | ............... | A41D 1/06 2/24 |
| 6,341,384 B1 | 1/2002 | Hayes | | |
| 6,407,019 B1 * | 6/2002 | Schafer | ............... | A41D 31/085 442/408 |
| 6,415,449 B2 * | 7/2002 | Duplock | ............... | A41D 13/012 2/275 |
| 6,430,754 B1 * | 8/2002 | Taylor | ............... | A41D 13/00 2/458 |
| 6,481,015 B1 * | 11/2002 | Lanier | ............... | A41D 31/102 2/2.5 |
| 6,531,419 B1 * | 3/2003 | Wyner | ............... | B32B 27/40 442/136 |
| 6,562,741 B1 * | 5/2003 | Lilani | ............... | D02G 3/443 442/301 |
| 8,722,145 B2 | 5/2014 | Panse et al. | | |
| 2001/0034897 A1 * | 11/2001 | Belcher | ............... | A62B 17/003 2/458 |
| 2002/0069453 A1 * | 6/2002 | Kelleher | ............... | A62B 17/003 2/458 |
| 2002/0137412 A1 * | 9/2002 | Grilliot | ............... | B32B 5/18 442/76 |
| 2002/0142132 A1 * | 10/2002 | Fourmeux | ............... | A41D 31/08 428/138 |
| 2004/0096629 A1 * | 5/2004 | Aneja | ............... | D04H 1/541 428/182 |
| 2004/0116022 A1 * | 6/2004 | Langley | ............... | A41D 31/02 442/289 |
| 2004/0214489 A1 * | 10/2004 | Porter | ............... | B32B 5/26 442/36 |
| 2004/0253891 A1 * | 12/2004 | Schierenbeck | ........... | B32B 5/18 442/268 |
| 2004/0266293 A1 * | 12/2004 | Thiriot | ............... | D03D 15/04 442/59 |
| 2004/0266297 A1 * | 12/2004 | Schierenbeck | ........... | B32B 5/18 442/239 |
| 2005/0097652 A1 * | 5/2005 | Rock | ............... | A41D 31/02 2/82 |
| 2005/0124256 A1 * | 6/2005 | Mason | ............... | A41D 31/02 442/394 |
| 2005/0255771 A1 * | 11/2005 | Chetty | ............... | B32B 27/12 442/136 |

(56) References Cited

U.S. PATENT DOCUMENTS

| | | | |
|---|---|---|---|
| 2005/0266754 A1* | 12/2005 | Wyner | A62D 5/00 442/76 |
| 2005/0287894 A1* | 12/2005 | Burns | A47C 31/001 442/136 |
| 2006/0019566 A1* | 1/2006 | Lloyd | B32B 5/26 442/136 |
| 2006/0035555 A1* | 2/2006 | Narayanan | B32B 5/022 442/387 |
| 2007/0026752 A1* | 2/2007 | Thiriot | A41D 31/08 442/217 |
| 2007/0082189 A1* | 4/2007 | Gillette | B32B 5/18 428/304.4 |
| 2007/0087642 A1* | 4/2007 | Bridgeman | D04H 1/52 442/302 |
| 2007/0094763 A1* | 5/2007 | Silver | A41D 13/00 2/69 |
| 2007/0123127 A1* | 5/2007 | Hirschmann, Jr. | B32B 5/022 442/136 |
| 2007/0130667 A1* | 6/2007 | Gagnon | A41D 27/02 2/93 |
| 2007/0137012 A1* | 6/2007 | Laton | A62B 17/003 28/167 |
| 2007/0166503 A1* | 7/2007 | Hannigan | A41D 31/02 428/59 |
| 2007/0284558 A1* | 12/2007 | Flay | A41D 31/085 252/608 |
| 2008/0032114 A1* | 2/2008 | Squires | B32B 27/12 428/308.4 |
| 2008/0263744 A1* | 10/2008 | Di Giovanni | A41D 31/085 2/81 |
| 2009/0077724 A1* | 3/2009 | Courtney | A41D 13/00 2/457 |
| 2009/0094726 A1* | 4/2009 | Grilliot | A41D 31/085 2/81 |
| 2009/0111345 A1* | 4/2009 | Panse | B32B 7/04 442/138 |
| 2009/0137176 A1* | 5/2009 | Okuya | D03D 11/00 442/189 |
| 2009/0246485 A1* | 10/2009 | Panse | B32B 7/14 428/201 |
| 2009/0300833 A1* | 12/2009 | Kampert | B32B 9/02 2/458 |
| 2009/0320176 A1* | 12/2009 | Curtis | A41D 31/0027 2/81 |
| 2010/0024102 A1* | 2/2010 | Steingrube | B32B 25/10 2/457 |
| 2010/0138983 A1* | 6/2010 | Kim | B32B 5/26 2/458 |
| 2010/0251466 A1* | 10/2010 | Langley | B32B 5/18 2/458 |
| 2011/0076494 A1* | 3/2011 | Gunzel | B32B 5/02 428/355 R |
| 2011/0107621 A1* | 5/2011 | Mordecai | A43B 3/02 36/113 |
| 2011/0165397 A1* | 7/2011 | Roe | D04H 1/435 428/219 |
| 2011/0271416 A1* | 11/2011 | Sturgill | B32B 5/18 2/69 |
| 2012/0238169 A1* | 9/2012 | Mason | A41D 31/02 442/189 |
| 2013/0174334 A1* | 7/2013 | Kuroda | D03D 13/008 2/455 |
| 2013/0198927 A1* | 8/2013 | Johnson | B32B 5/24 2/87 |
| 2013/0205481 A1* | 8/2013 | Underwood | A41D 27/02 2/455 |
| 2014/0087129 A1* | 3/2014 | Shiels | D04H 1/4342 428/131 |
| 2014/0259328 A1* | 9/2014 | Maples | A41D 31/085 2/455 |
| 2014/0259331 A1 | 9/2014 | Maples et al. | |
| 2014/0356574 A1* | 12/2014 | Conolly | B32B 5/024 428/138 |
| 2016/0113340 A1* | 4/2016 | Levit | A41D 31/0027 2/455 |
| 2016/0129668 A1* | 5/2016 | Kurian | B32B 5/245 442/223 |
| 2016/0244880 A1* | 8/2016 | Thompson | H05F 3/00 |
| 2016/0339664 A1* | 11/2016 | Gallagher | B32B 5/30 |
| 2017/0120082 A1* | 5/2017 | Barbeau | A62B 17/003 |
| 2017/0182733 A1* | 6/2017 | Orologio | B32B 7/05 |

FOREIGN PATENT DOCUMENTS

| | | | | |
|---|---|---|---|---|
| CN | 101199886 A | * | 6/2008 | |
| CN | 102429335 A | * | 5/2012 | |
| CN | 102429336 A | * | 5/2012 | |
| CN | 202286462 U | * | 7/2012 | |
| CN | 202407218 U | * | 9/2012 | |
| CN | 102785404 A | * | 11/2012 | |
| CN | 102785432 A | * | 11/2012 | |
| CN | 202750777 U | * | 2/2013 | |
| CN | 104013146 A | * | 9/2014 | |
| CN | 203805445 U | * | 9/2014 | |
| CN | 104228239 A | * | 12/2014 | |
| CN | 204640977 U | * | 9/2015 | |
| CN | 105172288 A | * | 12/2015 | A41D 31/085 |
| DE | 2737756 A1 | * | 3/1979 | A41D 31/02 |
| DE | 102007003136 A1 | * | 7/2008 | E04B 1/78 |
| FR | 2522587 A1 | * | 9/1983 | A41D 31/02 |
| FR | 2846201 A1 | * | 4/2004 | B32B 5/26 |
| GB | 2067134 A | * | 7/1981 | B32B 27/12 |
| GB | 2110068 A | * | 6/1983 | A41D 3/00 |
| GB | 2155853 A | * | 10/1985 | B32B 27/12 |
| JP | 57018619 U | * | 1/1982 | A41D 3/00 |
| JP | 57089875 A | * | 6/1982 | B32B 27/12 |
| JP | 58131915 U | * | 9/1983 | |
| JP | 09105059 A | * | 4/1997 | E04B 1/78 |
| JP | 3057644 U | * | 6/1999 | A41D 31/02 |
| JP | 2000212810 A | * | 8/2000 | A41D 31/02 |
| KR | 20060004318 A | * | 1/2006 | |
| KR | 20090040977 A | * | 4/2009 | |
| KR | 100929207 B1 | * | 12/2009 | |
| KR | 100930511 B1 | * | 12/2009 | |
| KR | 101394114 B1 | * | 5/2014 | |
| WO | WO-9006073 A1 | * | 6/1990 | A47G 9/0207 |
| WO | WO-2009145740 A1 | * | 12/2009 | A62B 17/003 |
| WO | 2011131675 A1 | | 10/2011 | |

OTHER PUBLICATIONS

Firefighter Nation, Turnout Gear: Heat Stress and THL, Jul. 2012 (Year: 2012).*
International Search Report and Written Opinion, PCT Application No. PCT/US2017/013157, dated Apr. 4, 2017.
International Preliminary Report on Patentability, PCT Application No. PCT/US2017/013157, dated Jul. 26, 2018.

* cited by examiner

US 10,485,281 B2

FLAME RESISTANT THERMAL LINERS AND GARMENTS MADE WITH SAME

CROSS REFERENCE TO RELATED APPLICATIONS

This application claims the benefit of U.S. Provisional Application Ser. No. 62/278,865, filed on Jan. 14, 2016, entitled "Improved Flame Resistant Thermal Liner," the entirety of which is hereby incorporated by this reference.

FIELD

Embodiments of the present invention relate to improved thermal liners and protective garments incorporating such liners.

BACKGROUND

Protective garments are designed to protect the wearer from hazardous environmental conditions the wearer might encounter. Such garments include those designed to be worn by firefighters and other rescue personnel, industrial and electrical workers, and military personnel.

Standards have been promulgated that govern the performance of such garments (or constituent layers or parts of such garments) to ensure that the garments sufficiently protect the wearer in hazardous situations. For example, NFPA 2112 (2012 edition, incorporated herein by this reference) governs the required performance of industrial worker garments that protect against flash fires. National Fire Protection Association 1971: *Standard on Protective Ensembles for Structural Fire Fighting and Proximity Fire Fighting* (2013 edition, incorporated herein by this reference) (hereinafter "NFPA 1971") governs the required performance of firefighter garments.

Structural firefighter garments, such as firefighters' turn-out gear, typically consist of matching coat and pants and are designed primarily to prevent the wearer from sustaining a serious burn. NFPA 1971 compliant turnout gear or garments 10 are typically comprised of three layers (as shown in FIGS. 1 and 2): an outer shell 12, an intermediate moisture barrier 14, and a thermal liner 20. The outer shell 12 is usually a woven fabric made from flame resistant fibers and is considered a firefighter's first line of defense. Not only should it resist flame, but it needs to be tough and durable so as not to be torn, abraded, or snagged during normal firefighting activities.

The moisture barrier 14, which is also flame resistant, is present to keep water, harmful chemicals, bacteria, and bodily fluids from penetrating the turnout gear and affecting the wearer. The moisture barrier 14 can be constructed of a non-woven or woven flame resistant fabric 16 that is laminated to a water-impermeable layer of material 18 such as, for instance, a layer of expanded polytetrafluoroethylene ("ePTFE"), polyurethane, or combinations thereof.

The thermal liner 20 is flame resistant and offers the bulk of the thermal protection afforded by the ensemble. A traditional thermal liner consists of a batting of flame resistant thermal insulating materials 22 quilted to a lightweight facecloth 24, also made of flame resistant fibers. The facecloth 24 is commonly quilted to the batting 22 in a cross-over or chicken wire pattern. The thermal liner 20 is the innermost layer of the firefighter's garment, with the facecloth 24 typically facing the wearer.

The batting 22 of the thermal liner can be a single layer of nonwoven fabric, but more typically is formed of multiple nonwoven layers. For example, the nonwoven fabrics used in many thermal liners are 1.5 ounces per square yards ("osy") and/or 2.3 osy spunlace fabrics. Regardless of whether single or multiple layers are used, conventional battings are designed to be relatively bulky as such a property has been thought necessary to trap air and thereby impart the required thermal protection to the wearer.

The thermal protection that a garment fabric affords the wearer is measured by determining the fabric's Thermal Protective Performance (TPP) in accordance with ISO 17492: *Clothing for protection against heat and flame—Determination of heat transmission on exposure to both flame and radiant heat* (2003, incorporated herein by this reference), as modified by NFPA 1971. The TPP test predicts the rate at which radiant and convective heat transfer through the three layers of the garment fabric (outer shell, moisture barrier, and thermal liner) to a level that will cause a second-degree burn to the human skin. More specifically, the test measures the amount of time at a given energy level it takes for enough heat to pass through the composite to cause a second degree burn. The minimum TPP rating for NFPA 1971-compliant coats and trousers is 35 calories/cm$^2$ (which equates to about 17.5 seconds of protection before a second-degree burn results). The higher the number, the more protective the garment system is considered. The TPP test method is fully described in chapter 8.10 of NFPA 1971.

While TPP is a measure of the ability of the garment fabric to protect the wearer from heat and flame, it must be balanced with the Total Heat Loss (THL) of the fabric. THL measures the ability of the garment fabric to allow heat and moisture vapor to escape from the wearer through the fabric to thereby avoid heat stress on the wearer. Typically there is a tradeoff between TPP and THL—the performance of one must be sacrificed to improve the performance of the other.

The testing methodology used for measuring THL is set forth in ASTM F 1868-14: *Standard Test Method for Thermal and Evaporative Resistance of Clothing Materials Using a Sweating Hot Plate* (2002, incorporated herein by this reference), as modified by NFPA 1971. Generally, however, the garment fabric (consisting of the outer shell, moisture barrier, and thermal liner) is laid on a 35° C. (+/−0.5° C.) hot plate in an environment with an air temperature of 25° C. (+/−0.5° C.). The test is conducted with both a wet and a dry hot plate. The amount of energy (measured in watts/m$^2$) it takes to maintain the hot plate at 98.6° F. is measured. Higher THL values mean that more energy must be supplied to the plate to maintain the temperature because the fabric is permitting heat to escape through the garment fabric. Thus, the higher the THL value, the less insulative the fabric but the less risk of the fabric contributing the heat stress of the wearer. A minimum THL value of 205 watts/m$^2$ is required to comply with NFPA 1971.

SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Embodiments of the present invention replace relatively bulky nonwoven thermal insulating materials used in thermal liners with thin, lightweight, flexible films that maintain or improve TPP performance while reducing the thickness, and enhancing the flexibility, of the thermal liner so as to increase wearer comfort. Moreover, the films incorporated into the thermal liners can be both air and vapor permeable such that the TPP performance is not realized at the expense of THL performance. Rather, the THL performance of garments incorporating embodiments of thermal liners contemplated herein is comparable to—if not improved over—garments formed with traditional thermal liners.

BRIEF DESCRIPTION OF THE FIGURES

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention replace relatively bulky nonwoven thermal insulating materials used in thermal liners with thin, lightweight, flexible films that maintain or improve TPP performance while reducing the thickness, and enhancing the flexibility, of the thermal liner so as to increase wearer comfort. Moreover, the films incorporated into the thermal liners can be both air and vapor permeable such that the TPP performance is not realized at the expense of THL performance. Rather, the THL performance of garments incorporating embodiments of thermal liners contemplated herein is comparable to—if not improved over—garments formed with traditional thermal liners.

More specifically, some embodiments of the thermal liners are formed as a composite of at least one layer of a flame resistant, thin, air and moisture vapor permeable, water resistant, flexible, insulating material, such as a film or membrane ("film layer"), in combination with a flame resistant, lightweight, low density, flexible, air and moisture vapor permeable, insulating textile or foam structure, such as spunlace/needlepunch or other nonwoven structure, textile, knit, etc. ("textile layer").

"Air permeable" as used herein means that air may pass through or permeate the material. "Moisture vapor permeable" or "vapor permeable" as used herein means that moisture vapor may pass through or permeate the material. "Water resistant" as used herein means that water may pass through the material upon application of pressure or in the event that the surface tension of the material is disrupted, such as in the case of soiling. This is in contrast to "waterproof," whereby water cannot pass through the material even under substantial pressure.

Figure 2:
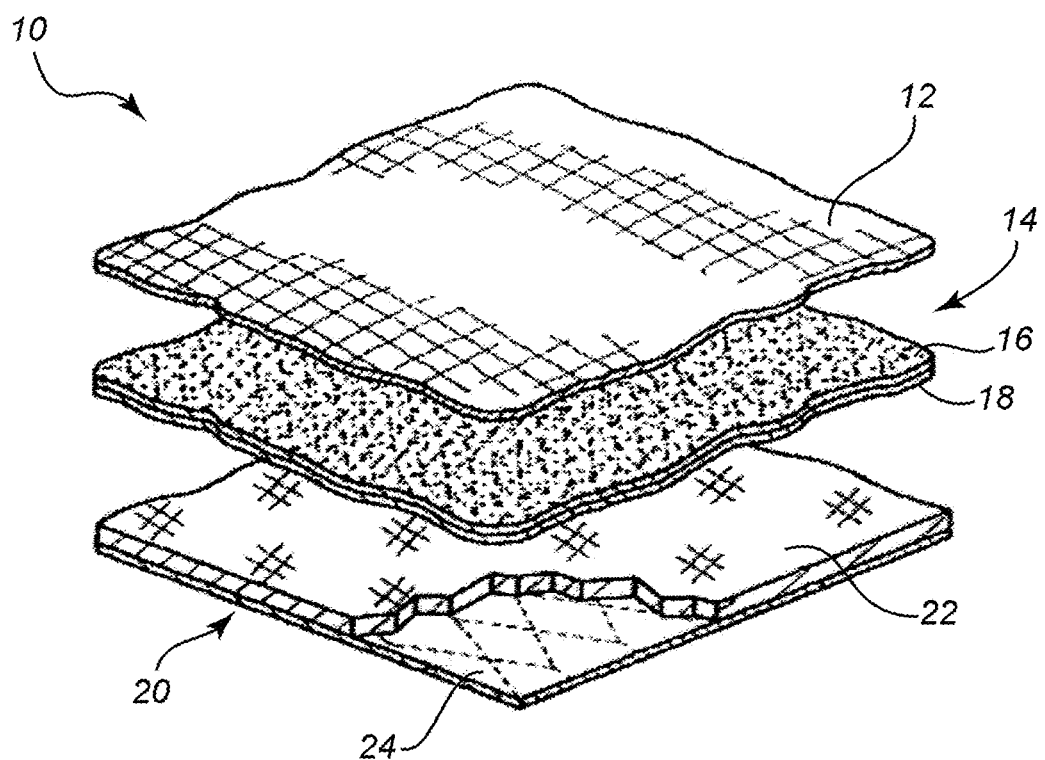
FIG. 2 illustrates an exploded perspective view of a portion of the prior art protective garment illustrated in FIG. 1.
Figure 3:
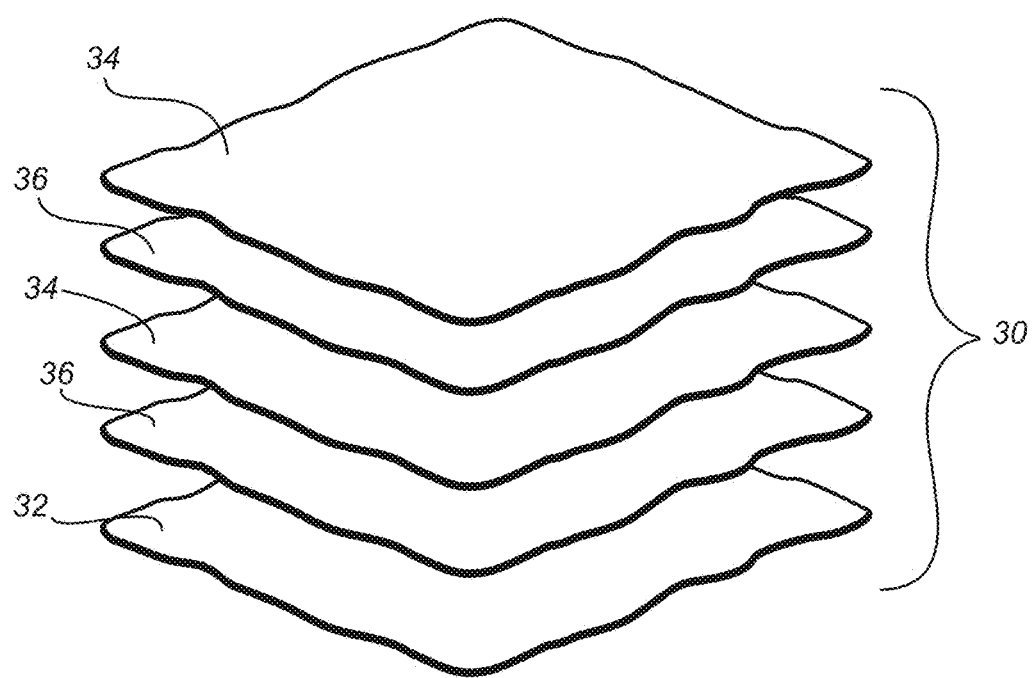
FIG. 3 illustrates an exploded view of a portion of an embodiment of a thermal liner contemplated herein.

FIG. 3 depicts an embodiment of a thermal liner 30 contemplated herein (the composite is shown exploded for ease of discussion). In use, the thermal liner 30 would replace the thermal liner 20 in the garment of FIGS. 1 and 2. The thermal liner 30 includes a customary flame resistant woven or knitted facecloth 32.

The thermal liner 30 of FIG. 3 further includes alternating film layers 34 and textile layers 36. While two film layers 34 and two textile layers 36 are shown in the embodiment of FIG. 3, as few as one film layer 34 and one textile layer 36 may be used and more than two layers of each may be used. The same number of film layers 34 and textile layers 36 can, but need not, be used. Moreover, multiple film layers 34 may be provided between adjacent textile layers 36 and vice versa (i.e., they need not alternate). In still other embodiments, the thermal liner 30 includes a facecloth 32 and one or more film layers 34 but is devoid of a textile layer 36.

Figure 1:
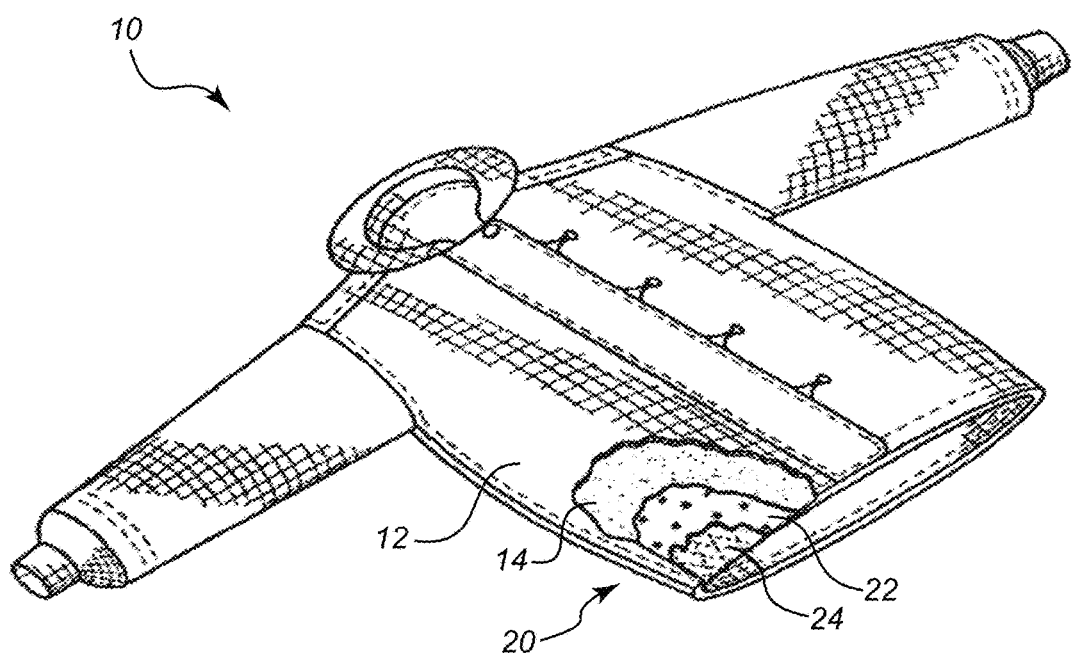
FIG. 1 illustrates a partial cut-away view of a prior art protective garment.

Either the film layer 34 or the textile layer 36 may be positioned adjacent the facecloth 32 of the thermal liner 30 and as the exposed layer on the opposite side of the thermal liner (i.e., the side adjacent the intermediate moisture barrier layer 14 in the garment 10 of FIG. 1). In some embodiments, it may be desirable for a film layer 34 to be exposed on the thermal liner 30 so as to be directly adjacent the intermediate moisture barrier 14 in the garment fabric. But, again, such an orientation is not required.

The textile layer 36 can be one or more of a lightweight, low density, flexible, air and moisture vapor permeable, insulating textile or foam structure, such as a spunlace, needlepunch or other nonwoven structure, a woven material, a knitted material, etc. In some embodiments, the textile layer 36 is a nonwoven fabric, such as, but not limited to, a spunlace or needlepunch. Not all of the textile layers 36 provided in the thermal liner 30 need be the same. Rather, different textile layers 36 may be combined in different ways within the thermal liner 30.

Textile layers 36 having a lower weight than those conventionally used in thermal liners may be, but do not have to be, used. For example, in some embodiments, a textile layer 36 weighs 0.3-5.0 osy, inclusive; 0.3-4.0 osy, inclusive; 0.3-3.0 osy, inclusive; 0.3-2.0 osy, inclusive; and/or 0.3-1.0 osy, inclusive. In some embodiments, a textile layer 36 weighs 0.5-1.4 or 0.5-1.0 osy, inclusive. In some embodiments, a textile layer 36 weighs 0.7-0.9 osy, inclusive. In some embodiments, a textile layer 36 weighs 0.8-0.9 osy, inclusive. The weight of a textile layer 36 may depend on the number of layers (textile layer(s) and/or film layer(s)) incorporated into the thermal liner 30. For example, if only a single textile layer 36 is used, it may be preferable that the textile layer be of a heavier weight than if multiple textile or film layers are used. Moreover, the weight of different textile layers 36 used in a thermal liner 30 can be the same or different.

The textile layer 36 may be apertured or otherwise patterned, textured, etc. but need not be in all embodiments.

If apertured, apertures of any size may be provided in the textile layer 36 in any density.

In some embodiments, the film layer 34 is formed of a thin, air and moisture vapor permeable, water resistant, flexible, insulating material. In some embodiments, the film layer 34 serves to resist the passage of hot air through the thermal liner system to the wearer. In some embodiments, one or more of the film layer(s) 34 is an expanded polytetrafluoroethylene ("ePTFE") film. A film layer 34 may be (1) vapor permeable, waterproof, and air impermeable (e.g., a capped ePTFE) or (2) air permeable, vapor permeable, and water resistant (e.g., an uncapped ePTFE, eVent, etc.).

In other embodiments, one or more film layer(s) 34 can be formed of a flame resistant urethane having a microporous (air permeable, vapor permeable, and water resistant) structure or molecular sieve (vapor permeable, waterproof, air impermeable) structure. In still other embodiments, one or more film layer(s) 34 may be formed of combinations of ePTFE and urethane materials, such as, but not limited to, those described above. Furthermore, not all of the film layers 34 provided in the thermal liner 30 need be the same. Rather, different film layers 34 may be combined in different ways within the thermal liner 30.

While a film layer 34 may be of any weight, it is preferably lightweight and weighs between 0.3-2.0 osy, inclusive; 0.3-1.5 osy, inclusive; and 0.5-1.2 osy, inclusive. The weight of a film layer 34 may depend on the number of layers (textile layer(s) and/or film layer(s)) incorporated into the thermal liner 30. For example, if only a single film layer 34 is used, it may be preferable that the film layer be of a heavier weight than if multiple film/textile layers are used. Moreover, the weight of different film layers 34 used in a thermal liner 30 can be the same or different. In some specific and non-limiting embodiments, a film layer 34 weighs no more than 1.2 osy.

The facecloth 32, film layer(s) 34, and textile layer(s) 36 are preferably formed of materials (including, but not limited to, flame resistant materials) that, when incorporated into a thermal liner 30, permits the thermal liner 30 to comply with all of the applicable NFPA 1971 requirements, including, but not limited to, the thermal protective requirements of having a 4 inch (or less) char length and a 2 second (or less) afterflame when the thermal liner is tested pursuant to the testing methodology set forth in ASTM D 6413: *Standard Test Method for Flame Resistance of Textiles* (2015), the entirety of which is hereby incorporated by reference.

To test for char length and afterflame, a fabric specimen is suspended vertically over a flame for twelve seconds. The fabric must self-extinguish within two seconds (i.e., it must have a 2 second or less afterflame). After the fabric self-extinguishes, a specified amount of weight is attached to the fabric and the fabric lifted so that the weight is suspended from the fabric. The fabric will typically tear along the charred portion of the fabric. The length of the tear (i.e., the char length) must be 4 inches or less when the test is performed in both the machine/warp and cross-machine/weft directions of the fabric. A fabric sample is typically tested for compliance both before it has been washed (and thus when the fabric still contains residual—and often flammable—chemicals from finishing processes) and after a certain number of launderings (5 launderings for NFPA 1971).

It is contemplated that the facecloth 32, film layer(s) 34, and textile layer(s) 36 may be selected to render the entire thermal liner 30 stretchable. By way only of example, both the facecloth 32 and textile layer(s) 36 could be knitted fabrics and a stretchable film layer(s) 34 used.

The thermal liner 30 can be assembled in a variety of ways. For example, in one embodiment, the facecloth 32, textile layer(s) 36, and film layer(s) 34 are quilted together to form the thermal liner 30. The film layer(s) 34 can be, but need not be, bonded to a supporting substrate (such as a textile layer(s)) prior to quilting. Rather, quilting the film layer(s) 34 directly to the facecloth 32 and textile layer(s) 36 may impart sufficient support to the film layer(s) 34 without sacrificing the flexibility of such layer(s) 34. In such cases, the film layer(s) 34 need not be bonded to or supported by a supporting substrate prior to quilting or attachment. In some embodiments, other attachment methods, such as lamination, can be used either in addition to, or instead of, quilting.

Provided below in Table 1 is an example of a prior art thermal liner ("Control Thermal Liner") and a non-limiting example of a thermal liner in accordance with embodiments of the invention ("Inventive Thermal Liner"). The various layers of the thermal liners were assembled and quilted together.

TABLE 1

| Thermal Liner | Structure (top to bottom) |
| --- | --- |
| Control Thermal Liner (Prior Art) | 2.3 osy spunlace |
| | 1.5 osy spunlace |
| | Caldura ® Facecloth |
| Inventive Thermal Liner | 1.0 osy film |
| | 0.9 osy spunlace |
| | 1.0 osy film |
| | 0.9 osy spunlace |
| | Caldura ® Facecloth |

Definitions of the terminology used in Table 1 are as follows:

The term "1.5 osy spunlace" is a non-apertured flame resistant spunlace fabric formed with 67% meta-aramid/33% para-aramid fibers having a weight of approximately 1.5 osy.

The term "2.3 osy spunlace" is non-apertured flame resistant spunlace fabric formed with 67% meta-aramid/33% para-aramid fibers having a weight of approximately 2.3 osy.

The term "0.9 osy spunlace" is an apertured flame resistant spunlace fabric formed with 67% meta-aramid/ 33% para-aramid fibers having a weight of approximately 0.9 osy.

The term "1.0 osy film" is a flame resistant ePTFE film having a weight of approximately 1.0 osy. The film is uncapped so as to be both air and vapor permeable as well as water resistant.

The term "Caldura® Facecloth" refers to a flame resistant woven fabric formed of 100% para-aramid filament yarns in the fill direction woven with spun yarns in the warp direction formed of a blend of 65% rayon fibers/ 25% para-aramid fibers/10% nylon. The fabric weighs approximately 3.5 osy and is available from TenCate®.

Various properties of the Control Thermal Liner and the Inventive Thermal Liner were tested. The thickness of the thermal liners was tested pursuant to ASTM D 1777 (2015): *Standard Test Method for Thickness of Textile Materials*, incorporated herein by this reference. The stiffness of the thermal liners in both the warp and fill directions was tested pursuant both to ASTM D 1388 (2014): *Standard Test Method for Stiffness of Fabrics* (Option A, Cantilever Test, Flexural Rigidity) and to ASTM D 4032 (2016): *Standard Test Method for Stiffness of Fabric by the Circular Bend Procedure*, both of which are herein incorporated by this reference. For both ASTM D 1388 and ASTM D 4032, lower test result values correlate to a more flexible fabric.

The thermal liner testing results are set forth in Table 2.

TABLE 2

| Thermal Liner | Weight (osy) | Thickness ASTM D 1777 (inches) | Stiffness ASTM D 1388 Cantilever Test Flexural Rigidity (microjoules/meter) | | Stiffness ASTM D 4032 (pounds force) | |
|---|---|---|---|---|---|---|
| | | | Warp | Fill | Warp | Fill |
| Control Thermal Liner | 7.5 | .062 | 6.06 | 6.75 | 4.33 | 4.37 |
| Inventive Thermal Liner | 7.4 | .05 | 1.93 | 3.74 | 2.16 | 1.74 |

Figure 4:
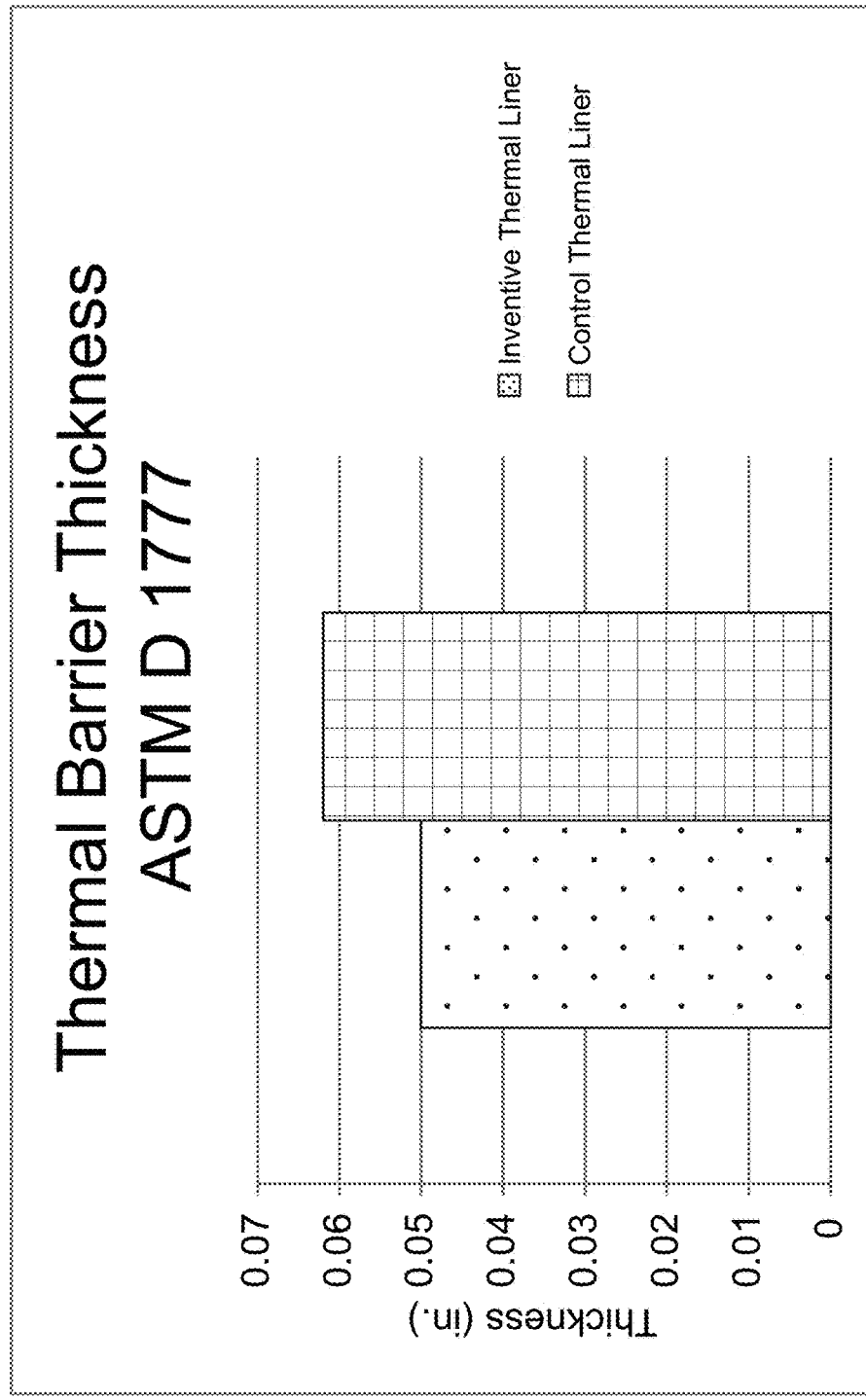
FIGS. 4-10 graphically represent performance data set forth in Tables 2 and 4.
Figure 5:
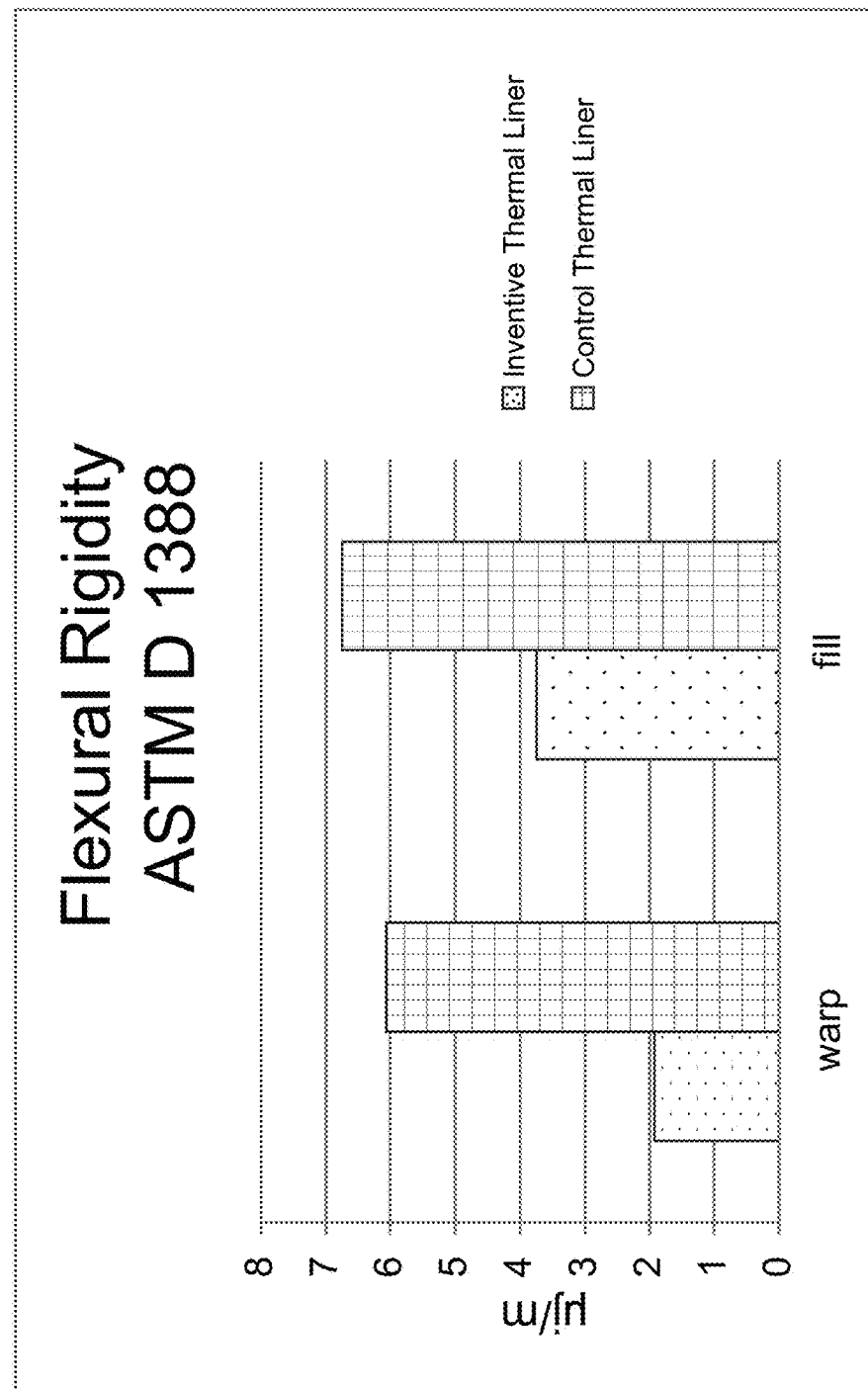
Figure 6:
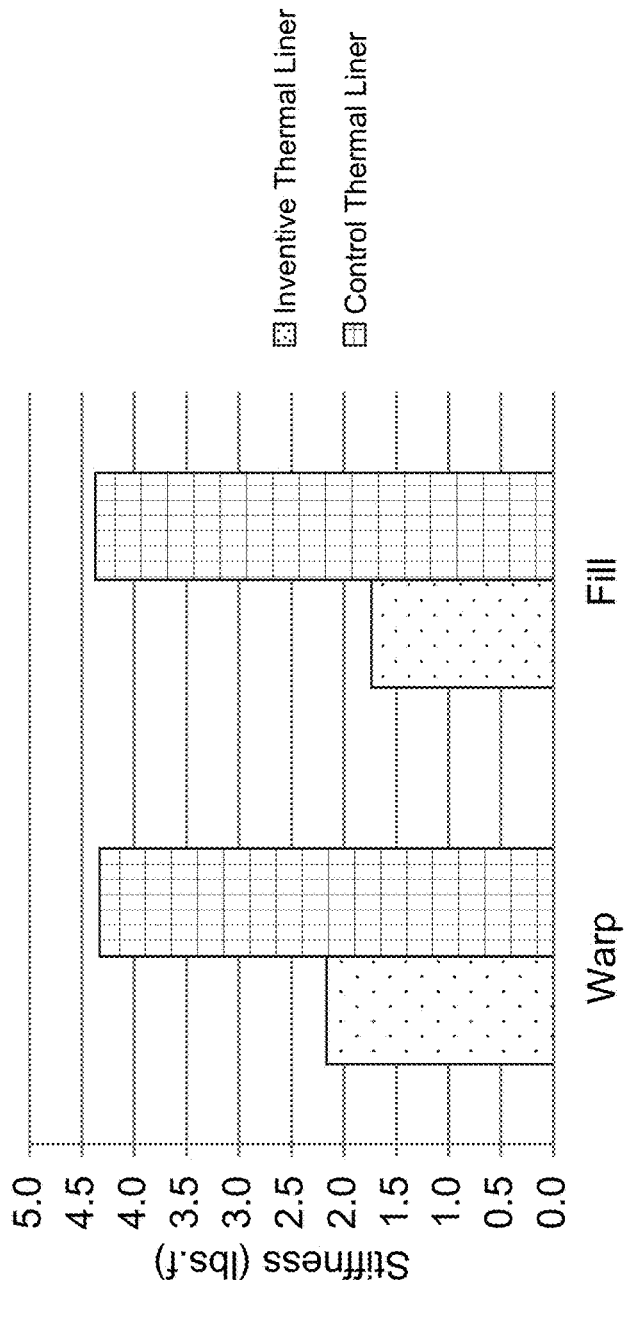
Figure 7:
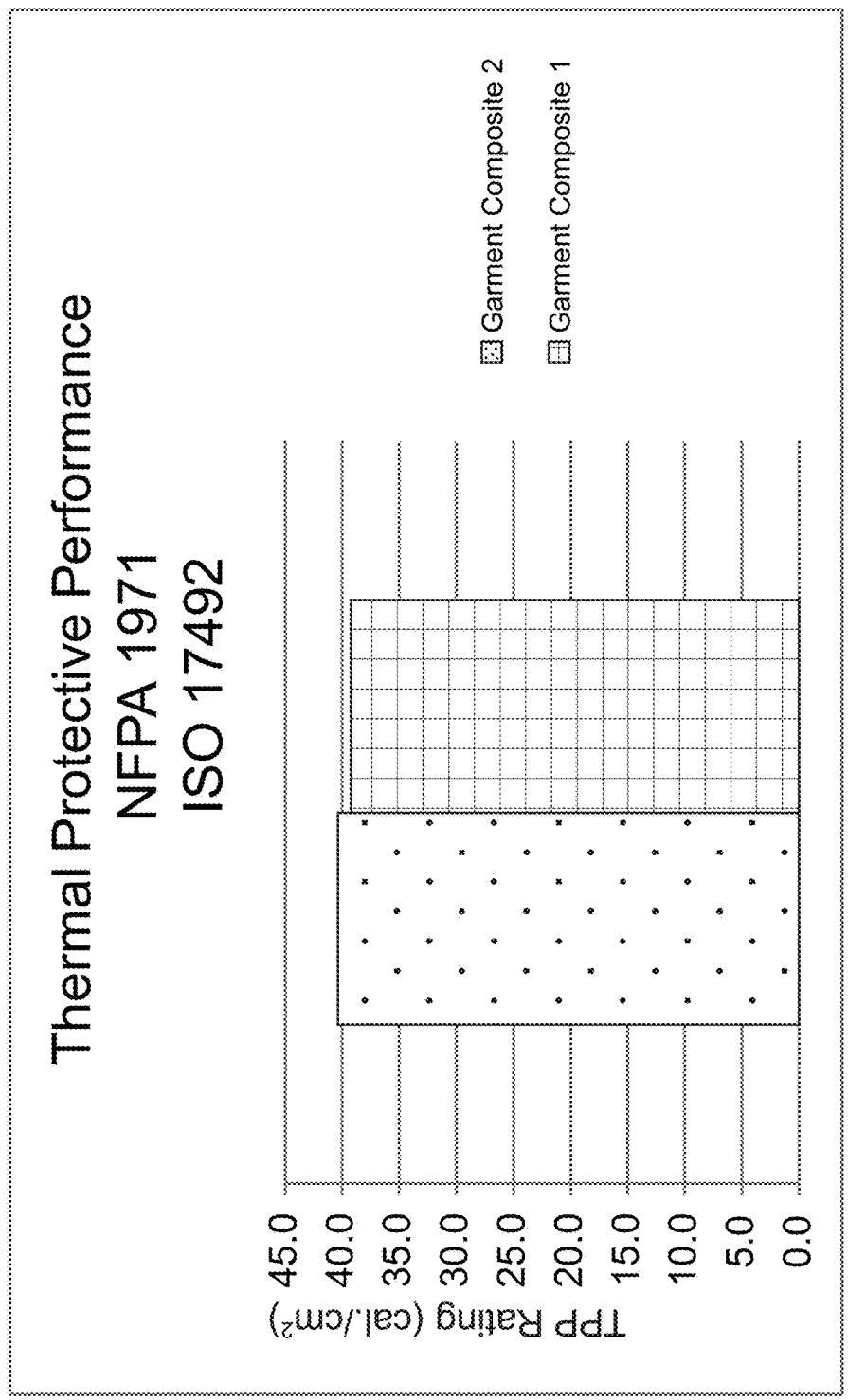
Figure 8:
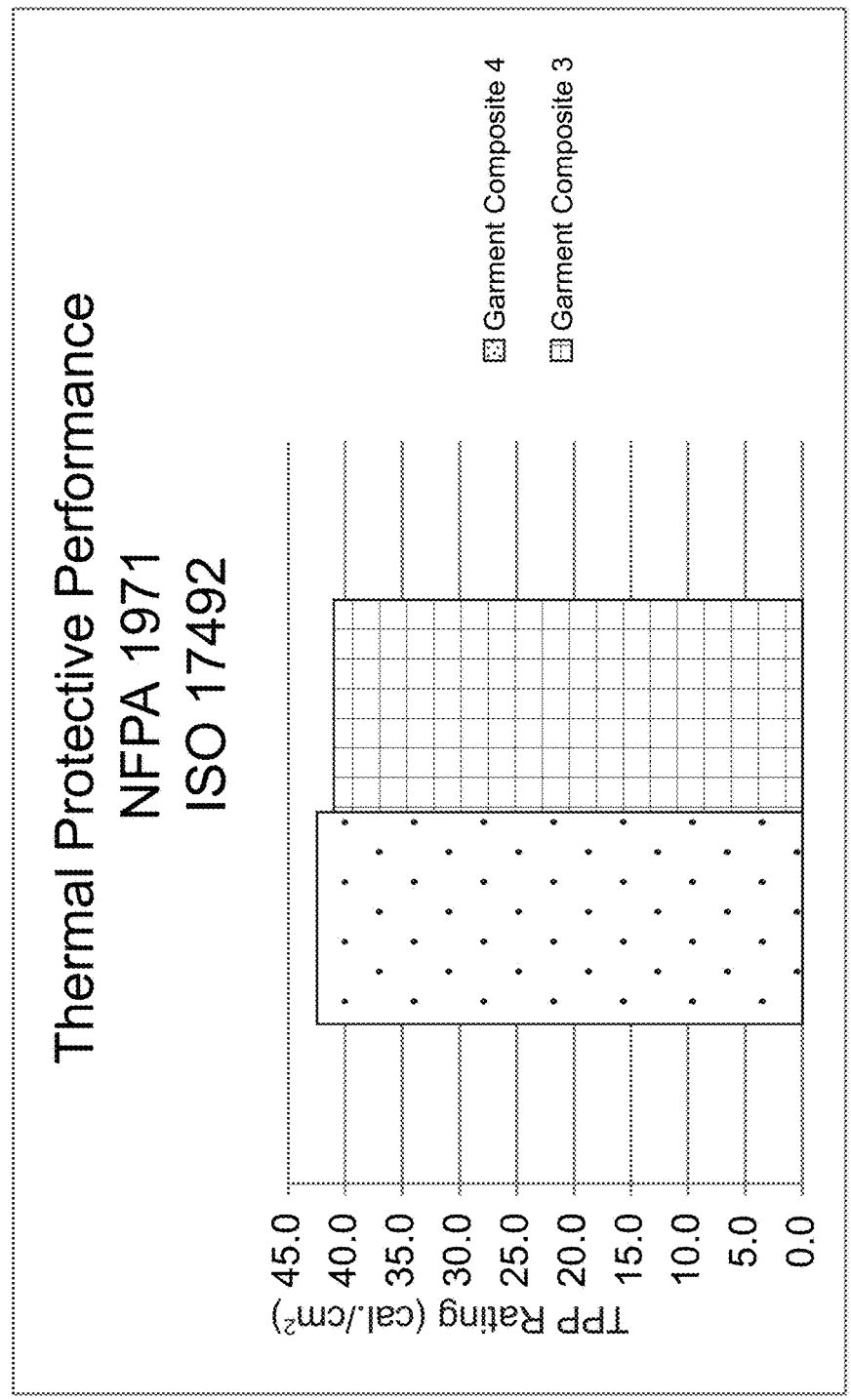
Figure 9:
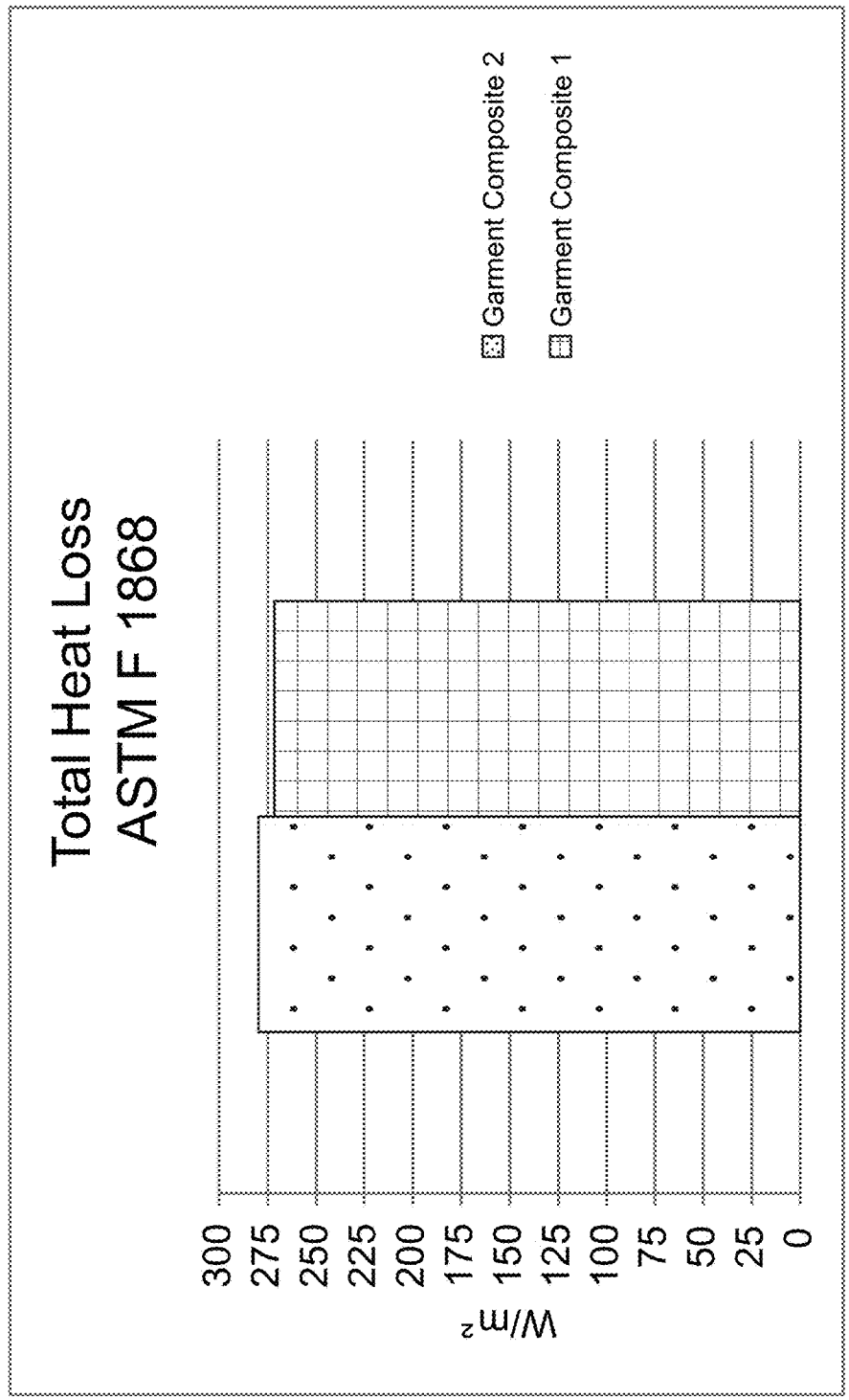
Figure 10:
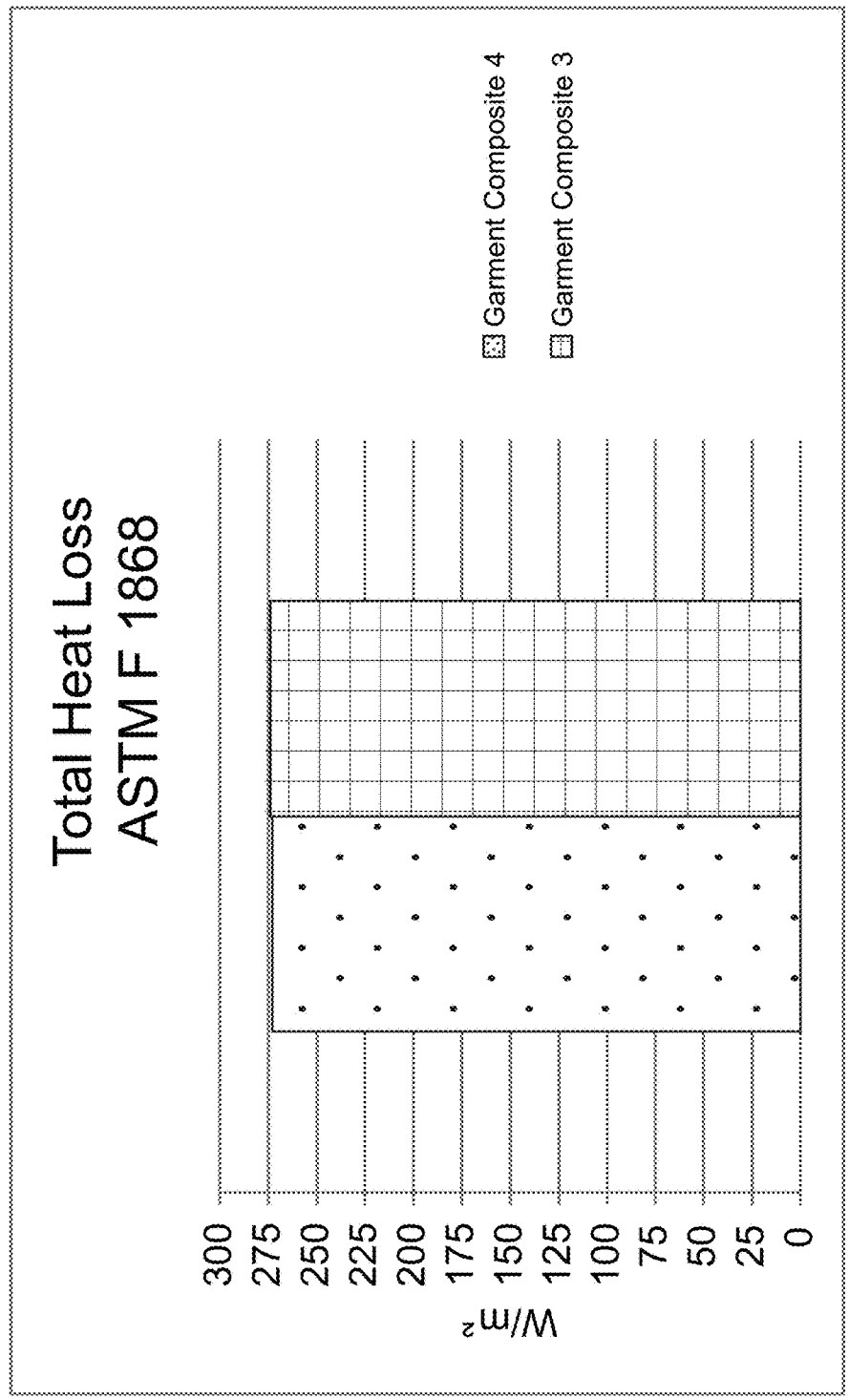

FIGS. 4-6 graphically display the thickness and stiffness results of Table 2. The Control Thermal Liner and the Inventive Thermal Liner were of approximately the same weight. But as is clearly evident from FIGS. 4-6, the Inventive Thermal Liner was thinner (on the order of 20% thinner) and much more flexible than the Control Thermal Liner. Thermal liners in accordance with some embodiments of the invention can have a stiffness in at least one (and possibly both) of the warp and weft directions of less than 5 microjoules/meter (μ/m), less than 4 μ/m, less than 3 μ/m, and less than 2 μ/m, when tested pursuant to ASTM D 1388 (Option A, Cantilever Test, Flexural Rigidity). Thermal liners in accordance with some embodiments of the invention can have a stiffness in at least one (and possibly both) of the warp and weft directions of less than 4 pounds force (lbs.f), less than 3 lbs.f, and less than 2 lbs.f, when tested pursuant to ASTM D 4032. Moreover, the Inventive Thermal Liner complied with all applicable requirements of NFPA 1971.

The thermal liners described in Table 1 were incorporated into conventional material layups for firefighter's garments that comply with NFPA 1971 so as to form garment composites (i.e., fabric composites with an outer shell, moisture barrier, and thermal liner) for turnout gear. More specifically, the thermal liners were incorporated into the garment composites set forth in Table 3.

TABLE 3

| | Outer Shell | Moisture Barrier | Thermal Liner |
|---|---|---|---|
| Garment Composite 1 | Pioneer ™ | CROSSTECH BLACK ® | Control Thermal Liner |
| Garment Composite 2 | Pioneer ™ | CROSSTECH BLACK ® | Inventive Thermal Liner |
| Garment Composite 3 | Agility ™ | CROSSTECH BLACK ® | Control Thermal Liner |
| Garment Composite 4 | Agility ™ | CROSSTECH BLACK ® | Inventive Thermal Liner |

Definitions of the terminology used in Table 3 are as follows:

"Pioneer™" refers to a 100% aramid (i.e., flame resistant) outer shell fabric available from TenCate®.

"Agility™" refers to an aramid blended (i.e., flame resistant) outer shell fabric available from TenCate®.

"CROSSTECH BLACK®" refers to a capped ePTFE layer laminated to a woven meta-aramid fabric layer. This moisture barrier is flame resistant, air impermeable, vapor permeable, and waterproof. CROSSTECH BLACK® is available from Gore®.

The thermal liners were positioned in the garment composites such that the top layer of the thermal liner (see Table 1) was positioned adjacent the moisture barrier. The garment composites were tested for TPP and/or THL performance, and the results are set forth in Table 4 below.

TABLE 4

| Garment Composite | TPP (calories/cm$^2$) (before wash) | THL (watts/m$^2$) (before wash) |
|---|---|---|
| 1 | 39.2 | 271.7 |
| 2 | 40.4 | 279.8 |
| 3 | 41 | 274.0 |
| 4 | 42.5 | 273.1 |

FIGS. 7-10 graphically display the TPP and THL results of Table 4. Garment Composites 2 and 4 (having the Inventive Thermal Liner) surpassed both the TPP and THL requirements set forth in NFPA 1971. More specifically, they both had TPP ratings well above the required 35 calories/cm$^2$ and THL values well above the required 205 watts/m$^2$.

Garment composites in accordance with some embodiments of the invention can have a TPP rating of at least 35 cal./cm$^2$ and higher, at least 38 cal./cm$^2$ and higher, at least 40 cal./cm$^2$ and higher, at least 42 cal./cm$^2$ and higher, and at least 44 cal./cm$^2$ and higher. Garment composites in accordance with some embodiments of the invention can have a THL value of at least 250 watts/m$^2$ and higher, at least 260 watts/m$^2$ and higher, at least 270 watts/m$^2$ and higher, and at least 280 watts/m$^2$ and higher.

Garment composites in accordance with embodiments of the invention comply with the requirements of NFPA 1971, as well as the equivalent European standard, EN 469 (2005): *Protective Clothing for Firemen* (and subsequent editions), and the equivalent international standard, ISO 11999 (2015): *PPE for firefighters—Test methods and requirements for PPE used by firefighters who are at risk of exposure to high levels of heat and/or flame while fighting fires occurring in structures* (and subsequent editions), all of which are herein incorporated by reference. More specifically, they comply with (1) the Heat Transfer Index (the European equivalent to TPP) requirements, when tested pursuant to EN 367 (1992): *Protective clothing; protection against heat and fire; method for determining heat transmission on exposure to flame* and its essential equivalent EN ISO 9151 (2016): *Protective clothing against heat and flame; determination of heat transmission on exposure to flame*, as well as (2) the Water Vapor Resistance (abbreviated R$_{ET}$ and the European equivalent to THL) requirements, when test pursuant to EN 31092 (1993): *Textiles; physiological effects; measurement of thermal and water-vapour resistance under steady-state conditions (sweating guarded-hotplate test)*, and its essential equivalent EN ISO 11092 (2014): *Textiles; physiological effects; measurement of thermal and water-vapour resistance under steady-state conditions (sweating guarded-hotplate test)*. All of the referenced standards and any subsequent editions thereof are herein incorporated by reference.

The conventional wisdom in the industry has been that relatively bulky thermal liners are required to impart the necessary TPP to the garment. However, embodiments of the thermal liners described herein demonstrate such is not the case. As evident from FIGS. 7 and 8, garment composites that include the Inventive Thermal Liner had TPP values that exceeded the TPP values of garment composites formed with conventional thermal liners (such as Control Thermal Liner), but that were otherwise identical. This is despite the fact that the Inventive Thermal Liner is thinner and less bulky than the Control Thermal Liner. Moreover, while affording the wearer better protection, garment composites formed with the Inventive Thermal Liner are also more comfortable to wear, given the thinner and more flexible nature of the Inventive Thermal Liner (and thus of the garment into which it is incorporated). A garment that is easier to maneuver within reduces the stress on the wearer.

The conventional wisdom in the industry has also been that films incorporated into garment composites detrimentally impact the THL value of the garment. Embodiments of the present invention prove that wisdom wrong. Rather, inclusion of a film layer(s) in embodiments of the thermal liner contemplated herein did not detrimentally impact the ability of the garment to allow heat and moisture vapor to escape from the wearer. As demonstrated in FIG. 9, the garment composite that included the Inventive Thermal Liner (Garment Composite 2) had a THL value that exceeded the THL value of the garment composite formed with a conventional thermal liner (such as Garment Composite 1 formed with the Control Thermal Liner), but that were otherwise identical. Moreover, the THL values of Garment Composites 3 and 4 were almost identical. See FIG. 10. Inclusion of air and vapor permeable film layers in the Inventive Thermal Liner permitted heat and vapor to escape from the wearer through the thermal liner.

Thus, a thinner, more flexible thermal liner may be incorporated into turnout garments without sacrificing—and indeed improving—the thermal performance (i.e., TPP) and heat management (i.e., THL) properties of the garment. In any event, garment composites that incorporate embodiments of the thermal liners contemplated herein will pass the TPP and THL requirements (as well as all other applicable requirements) of NFPA 1971.

Different arrangements of the components described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

We claim:

1. A garment composite comprising:
a. an outer shell layer comprising a flame resistant fabric;
b. a moisture barrier layer comprising a water-impermeable layer; and
c. a thermal liner layer comprising a flame resistant facecloth, at least one free-standing film layer, and at least one textile layer, wherein the flame resistant facecloth, the at least one textile layer, and the at least one film layer are quilted together, wherein the at least one film layer is air and vapor permeable and water resistant and wherein the thermal liner comprises at least one of (1) a stiffness in at least one of a warp direction and a weft direction of less than 5 microjoules/meter, when tested pursuant to ASTM D 1388 (2014) (Option A, Cantilever Test Flexural Rigidity) and (2) a stiffness in at least one of a warp direction and a-weft direction of less than 4 pounds force (lbf), when tested pursuant to ASTM D 4032 (2016),
wherein the flame resistant facecloth is exposed on a first side of the garment composite and the outer shell layer is exposed on the second side of the garment composite.

2. The garment composite of claim 1, wherein the at least one film layer is adjacent the moisture barrier layer in the garment composite.

3. The garment composite of claim 1, wherein the at least one textile layer comprises at least two textile layers and wherein the at least one film layer comprises at least two film layers.

4. The garment composite of claim 3, wherein the at least two film layers and the at least two textile layers alternate within the thermal liner layer.

5. The garment composite of claim 4, wherein one of the two textile layers is adjacent the flame resistant facecloth.

6. The garment composite of claim 1, wherein the at least one textile layer comprises a spunlace comprising a weight between 0.5-1.4 osy.

7. The garment composite of claim 1, wherein the at least one textile layer comprises apertures.

8. The garment composite of claim 1, wherein the at least one film layer comprises expanded polytetrafluoroethylene.

9. The garment composite of claim 1, wherein the at least one film layer comprises a weight of 0.3-2.0 osy.

10. The garment composite of claim 1, wherein the at least one film layer comprises a weight of no more than 1.2 osy.

11. The garment composite of claim 1, wherein the thermal liner layer has a char length of 4 inches or less and an afterflame of 2 seconds or less when tested pursuant to ASTM D 6413 (2015).

12. The garment composite of claim 1, wherein the garment composite has a thermal protective performance rating of at least 35 calories/cm$^2$ when tested pursuant to ISO 17492 (2003), as modified by NFPA 1971 (2013).

13. The garment composite of claim 1, wherein the garment composite has a thermal heat loss of at least 205 watts/m$^2$ when tested pursuant to ASTM F 1868 (2002), as modified by NFPA 1971 (2013).

14. A garment composite comprising:
a. an outer shell layer comprising a flame resistant fabric;
b. a moisture barrier layer comprising a water-impermeable layer; and
c. a thermal liner layer comprising a flame resistant facecloth, at east one free-standing film layer, and at least one textile layer, wherein the flame resistant facecloth, the at least one film layer, and the at least one textile layer are quilted together and wherein the at least one film layer is air and vapor permeable and water resistant and wherein the thermal liner layer comprises at least one of (1) a stiffness in at least one of a warp direction and a weft direction of less than 5 microjoules/meter, when tested pursuant to ASTM 01388 (2014) (Option A, Cantilever Test, Flexural Rigidity) and (2) a stiffness in at least one of a warp direction and a weft direction of less than 4 pounds force (lbf), when tested pursuant to ASTM D 4032 (2016),
wherein the flame resistant facecloth is exposed on a first side of the garment composite and the outer shell layer is exposed on a second side of the garment composite opposite the first side and wherein the garment composite has a thermal protective performance rating of at least 35 calories/cm$^2$ when tested pursuant to ISO 17492 (2003), as modified by NFPA 1971, and a thermal heat loss of at least 205 watts/m² when tested pursuant to ASTM F 1868 (2002), as modified by NFPA 1971.

15. The garment composite of claim 14, wherein:
i. the at least one textile layer comprises at least two textile layers;
ii. the at least one film layer comprises at least two film layers;
iii. the at least two film layers and the at least two textile layers alternate within the thermal liner layer;
iv. one of the two textile layers is adjacent the flame resistant facecloth; and
v. one of the two film layers is adjacent the moisture barrier layer.

\* \* \* \* \*